(12) United States Patent
Schwarte (10) Patent No.: US 8,459,025 B2
(45) Date of Patent: Jun. 11, 2013

(54) DEVICE FOR CONTROLLING THE EXHAUST-GAS TURBOCHARGING OF AN INTERNAL COMBUSTION ENGINE, AND INTERNAL COMBUSTION ENGINE

(75) Inventor: Anselm Schwarte, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 356 days.

(21) Appl. No.: 12/935,689

(22) PCT Filed: Mar. 2, 2009

(86) PCT No.: PCT/EP2009/052448
§ 371 (c)(1),
(2), (4) Date: Sep. 30, 2010

(87) PCT Pub. No.: WO2009/121674
PCT Pub. Date: Oct. 8, 2009

(65) Prior Publication Data
US 2011/0023848 A1    Feb. 3, 2011

(30) Foreign Application Priority Data
Apr. 3, 2008   (DE) ......................... 10 2008 017 164

(51) Int. Cl.
*F02B 33/44* (2006.01)
(52) U.S. Cl.
USPC .................. 60/611; 60/601; 60/602; 60/603; 60/605.1; 60/612; 701/106; 701/108; 701/115
(58) Field of Classification Search
USPC ............ 701/102, 103, 106, 115; 60/600–603, 60/605.1, 611, 612; 73/112.03, 112.05, 114.69, 73/114.76, 114.77
See application file for complete search history.

(56) References Cited

U.S. PATENT DOCUMENTS 5,063,744 A * 11/1991 Ishiyama et al. ................ 60/600
5,157,924 A * 10/1992 Sudmanns ....................... 60/612
(Continued)

FOREIGN PATENT DOCUMENTS

DE      10158247 A1     7/2003
DE   102004003378       8/2004
(Continued)

OTHER PUBLICATIONS

International Search Report and Written Opinion for Application No. PCT/EP2009/052448 (13 pages), Jul. 13, 2009.

*Primary Examiner* — Stephen K Cronin
*Assistant Examiner* — Joseph Dallo
(74) *Attorney, Agent, or Firm* — King & Spalding L.L.P.

(57) ABSTRACT

A device for controlling the exhaust-gas turbocharging of an internal combustion engine having an exhaust-gas turbocharging device, has an estimated value unit for determining a mass flow through a turbine system, a regulating unit for determining a regulating exhaust-gas back pressure as a function of a nominal charge pressure and an actual charge pressure, and also a unit for generating at least one actuating signal for at least one actuator of the turbine system as a function of the regulating exhaust-gas back pressure and of the mass flow through the turbine system, wherein the estimated value unit has a turbine system model for determining an estimated overall efficiency of the turbine system and a model for determining an estimated overall efficiency of a compressor system having at least two compressors, and wherein the regulating unit is set up to determine the regulating exhaust-gas back pressure using the estimated overall efficiencies

20 Claims, 4 Drawing Sheets

U.S. PATENT DOCUMENTS

| | | | | |
|---|---|---|---|---|
| 5,740,786 | A * | 4/1998 | Gartner | 123/568.12 |
| 6,112,523 | A * | 9/2000 | Kamo et al. | 60/612 |
| 6,293,103 | B1 * | 9/2001 | Gladden | 60/612 |
| 6,301,889 | B1 * | 10/2001 | Gladden et al. | 60/605.2 |
| 6,338,250 | B1 * | 1/2002 | Mackay | 60/612 |
| 6,378,308 | B1 * | 4/2002 | Pfluger | 60/612 |
| 6,694,736 | B2 * | 2/2004 | Pfluger | 60/612 |
| 6,922,996 | B2 * | 8/2005 | Ellmer et al. | 60/608 |
| 7,032,383 | B2 * | 4/2006 | Weber | 60/612 |
| 7,168,250 | B2 * | 1/2007 | Wei et al. | 60/605.2 |
| 7,174,713 | B2 | 2/2007 | Nitzke et al. | 60/605.2 |
| 7,770,392 | B2 * | 8/2010 | Birkner et al. | 60/602 |
| 7,779,633 | B2 | 8/2010 | Roettger et al. | 60/602 |
| 7,958,730 | B2 * | 6/2011 | Stewart | 60/612 |
| 8,091,358 | B2 * | 1/2012 | Panciroli | 60/602 |
| 8,209,979 | B2 * | 7/2012 | Wang et al. | 60/602 |
| 8,276,378 | B2 * | 10/2012 | Song et al. | 60/602 |
| 2003/0101723 | A1 | 6/2003 | Birkner et al. | 60/602 |
| 2006/0196182 | A1 * | 9/2006 | Kimoto et al. | 60/605.1 |

FOREIGN PATENT DOCUMENTS

| | | |
|---|---|---|
| DE | 10329330 | 3/2005 |
| DE | 102004005945 | 9/2005 |
| DE | 102006042872 | 3/2008 |
| EP | 1519017 | 3/2005 |
| JP | 58190519 A * | 11/1983 |
| JP | 06212979 A * | 8/1994 |
| WO | 2006106058 | 10/2006 |

* cited by examiner

DEVICE FOR CONTROLLING THE EXHAUST-GAS TURBOCHARGING OF AN INTERNAL COMBUSTION ENGINE, AND INTERNAL COMBUSTION ENGINE

CROSS-REFERENCE TO RELATED APPLICATIONS

This application is a U.S. National Stage Application of International Application No. PCT/EP2009/052448 filed Mar. 2, 2009, which designates the United States of America, and claims priority to German Application No. 10 2008 017 164.6 filed Apr. 3, 2008, the contents of which are hereby incorporated by reference in their entirety.

TECHNICAL FIELD

The invention relates to a device for controlling the exhaust-gas turbocharging of an internal combustion engine with an exhaust-gas turbocharging device, according to the preamble of the principal claim, as well as an internal combustion engine which contains a device of this kind.

BACKGROUND

The need for controlling devices of this kind for exhaust-gas turbocharging devices, which serve as an open-loop charge pressure control or charge pressure apparatus, is due on the one hand to the increasing demands on internal combustion engines with regard to emissions, responding qualities and comfort, and on the other hand, due to increasingly complex configurations of exhaust-gas turbochargers used for internal combustion engines. A generic device contains an estimated value unit which builds on a physical model of the internal combustion engine, a regulating unit for determining at least one regulating intermediate variable, which typically involves a regulating exhaust-gas back pressure, or a variable dependent on a nominal exhaust gas back pressure, in dependence upon a nominal charge pressure and an actual charge pressure measured as an operating parameter or derived from operating parameters, as well as an actuating signal generating unit for generating at least one actuating signal for at least one actuator of the turbine system.

A device of this kind for controlling exhaust-gas turbocharging is known, for example, in document WO 2006/106058 A1. This is a form of a model-based control insofar as physical models of the corresponding internal combustion engine, which require a modeling of the features of this internal combustion engine including the turbine system and the compressor system, are used in the estimated value unit as well as the regulating unit and the actuating signal generating unit. With regard to the development of numerous very different engine and exhaust-gas turbocharger configurations, the problem of needing to expend disadvantageously high effort on the development and maintenance of these control devices for these different configurations with correspondingly different algorithms and functions can be caused.

SUMMARY

According to various embodiments, a corresponding device for the control of exhaust-gas turbocharging can be developed, which can be adapted to the control of different system configurations of exhaust-gas turbocharging devices with the lowest expenditure/effort. The aim in this should be that an adaptation of the device to another system configuration is easily possible through an altered data input without new programming. Furthermore, according to various embodiments, an internal combustion engine can be proposed which features a correspondingly easy to install control device.

According to an embodiment, a device for controlling exhaust-gas turbocharging of an internal combustion engine with an exhaust-gas turbocharging device, may comprise: —an estimated value unit which comprises a physical model of the internal combustion engine, —a regulating unit for determining a regulating exhaust-gas back pressure or at least one other regulating intermediate variable in dependence upon a nominal charge pressure and an actual charge pressure, either measured as an operating parameter or derived from an operating parameter, —an actuating signal generating unit for generating at least one actuating signal for at least one actuator of the turbine system, wherein—the estimated value unit includes a turbine system model for determining an estimated overall efficiency of the turbine system, and a compressor system model for determining an overall efficiency of a compressor system of the exhaust-gas turbocharging device having at least two compressors and set up in an intake system of the internal combustion engine, with the regulating unit being set up for determining the regulating exhaust-gas back pressure or the at least one other regulating intermediate variable by using the estimated overall efficiencies of the turbine system and of the compressor system, and/or—the actuating signal generating unit includes an inverse turbine system model for generating at least one actuating signal in dependence upon the regulating exhaust-gas back pressure or at least one other regulating intermediate variable, and on at least one further operating parameter or estimated value determined by the estimated value unit.

According to a further embodiment, the estimated value unit can be set up to determine a mass flow through a turbine system of the exhaust-gas turbocharging device set up in an intake tract of the internal combustion engine, in dependence upon operating parameters of the internal combustion engine, whereby the actuating signal generating unit is set up for generating at least one actuating signal in dependence upon the estimated mass flow through the turbine system and preferably additionally in dependence upon an exhaust-gas pressure downstream of the turbine system, and upon an exhaust-gas temperature upstream of the turbine system. According to a further embodiment, the compressor system modeled by the compressor system model may comprise a low-pressure compressor and a high-pressure compressor connected in series downstream of the low-pressure compressor, with the compressor system model being set up for determining the overall efficiency of the compressor system, in dependence upon operating parameters of the internal combustion engine and on overall efficiencies of the low-pressure compressor and the high-pressure compressor modeled by engine maps. According to a further embodiment, the compressor system model can be set up for determining the overall efficiency of the compressor system as $$\eta_C = \eta_{C,LP} \cdot \eta_{C,HP} \cdot a / (\eta_{C,HP} \cdot b + \eta_{C,LP} \cdot c + b \cdot c)$$

or as a variable derived therefrom, whereby $\eta_C$ stands for the overall efficiency of the compressor system, $\eta_{C,LP}$ stands for the efficiency of the low-pressure compressor, and $\eta_{C,HP}$ stands for the efficiency of the high-pressure compressor, and whereby a, b, c stand for variables which only depend on the actual charge pressure, on a suction pressure measured as an operating parameter upstream of the compressor system and on a prevailing intermediate pressure in the intake tract between the low-pressure compressor and the high-pressure compressor. According to a further embodiment, the regulating unit may feature a controller as well as a pilot control for determining a pilot control exhaust-gas back pressure in dependence upon operating parameters of the internal combustion engine, on the nominal charge pressure and on the estimated overall efficiencies of the turbine system and of the compressor system, with the controller being set up for determining the regulating exhaust-gas back pressure by using the pilot control exhaust-gas back pressure. According to a further embodiment, the operating parameters used by the pilot control for determining the pilot control exhaust-gas back pressure or variables derived therefrom may comprise a suction pressure upstream of the compressor system, an exhaust-gas pressure downstream of the turbine system, an intake air temperature upstream of the compressor system, an exhaust-gas temperature upstream of the turbine system, a mass flow through the compressor system and the estimated mass flow through the turbine system, but no internal operating parameters of the compressor system or of the turbine system. According to a further embodiment, for the decoupling of a control circuit of the exhaust-gas turbocharging device from a control circuit of the exhaust-gas recirculation device of the internal combustion engine, the device comprises a decoupling unit which is set up for determining a decoupling mass flow by correcting the estimated mass flow through the turbine system in dependence upon a state variable or controlled variable of the exhaust-gas recirculation control, whereby the inverse turbine system model generates the at least one actuating signal in dependence upon the decoupling mass flow. According to a further embodiment, the turbine system modeled by the turbine system model and by the inverse turbine system model may comprise at least two turbines to power the at least two compressors. According to a further embodiment, among the turbines may be a high-pressure turbine and a low-pressure turbine connected in series downstream of the high-pressure turbine. According to a further embodiment, the turbine system may feature in each case at least one actuator controlled by the actuating signal generating unit both for a first and also for a second of the said turbines. According to a further embodiment, the actuating signal generating unit can be set up for generating at least one actuating signal for the at least one actuator of the first turbine, as well as at least one actuating signal for the at least one actuator of the second turbine such that dependent on whether a threshold value of a controlled variable is exceeded or is not reached, either only the at least one actuating signal assigned to the first turbine is varied, whereas the at least one actuator of the second turbine takes a constant extremal position, or only the at least one actuating signal assigned to the second turbine is varied, whereas the at least one actuator of the first turbine takes a constant extremal position, whereby if the threshold value is exceeded or is not reached, a switch is made between two different engine maps included in the inverse turbine system model. According to a further embodiment, the inverse turbine system model for generating the at least one actuating signal may comprise at least one engine map in dependence upon a pressure quotient which is generated from the regulating exhaust-gas back pressure, and an exhaust-gas pressure measured or calculated as an operating parameter downstream of the turbine system, and generated by a pressure- and temperature-normalized mass flow which is generated in dependence upon the estimated mass flow through the turbine system. According to a further embodiment, the at least one engine map of the inverse turbine system model may read out a combined actuating signal, which can be assigned to at least a first actuator and a second actuator such that during a monotonous varying of the combined actuating signal, first of all at a constant first position of the second actuator, the first actuator is monotonously varied, from a first to a second position of the first actuator, whereby on reaching the second position of the first actuator, the second actuator is monotonously varied from a first to a second position of the second actuator. According to a further embodiment, the actuating signal generating unit can be set up for generating the pressure- and temperature-normalized mass flow in dependence upon the regulating exhaust-gas back pressure and an exhaust-gas temperature measured as an operating parameter in the exhaust tract upstream of the turbine system. According to a further embodiment, the at least one engine map used by the inverse turbine system model may show no dependence on the internal operating parameters of the turbine system. According to a further embodiment, an overall efficiency of the turbine system can be determined by means of a combined actuating signal in the estimated value unit. According to a further embodiment, in the estimated value unit an exhaust-gas back pressure upstream of the turbine system can be determined by means of a combined actuating signal. According to a further embodiment, for determining the overall efficiency of the turbine system, the turbine system model may feature at least one engine map in dependence upon a pressure quotient generated from the regulating exhaust-gas back pressure, and an exhaust-gas pressure measured as an operating parameter downstream of the turbine system, and upon a current position of the at least one actuator. According to a further embodiment, the at least one engine map used by the turbine system model may show no dependence upon the internal operating parameters of the turbine system, at a given position of the at least one actuator of the turbine system.

According to another embodiment, an internal combustion engine, comprising an exhaust-gas turbocharging device with a turbine system set up in an intake tract of the internal combustion engine, and a compressor system, having at least two compressors, set up in an intake tract of the internal combustion engine, and may comprise a device for controlling exhaust-gas turbocharging as described above.

BRIEF DESCRIPTION OF THE DRAWINGS

Exemplary embodiments will be further explained in the FIGS. 1a, 1b and 2 to 6, in which.

DETAILED DESCRIPTION

According to various embodiments, it is intended that the estimated value unit features a turbine system model for determining an estimated overall efficiency of the turbine system, and a compressor system model for determining the estimated overall efficiency of a compressor system—set up in an intake system of the internal combustion engine—of the exhaust-gas turbocharging device having at least two compressors, with the regulating unit being equipped for determining the regulating exhaust-gas back pressure, or the at least one other regulating intermediate variable using the estimated overall efficiency of the turbine system and the compressor system, and/or that the actuating signal generating unit features an inverse turbine-system model for the turbine system having preferably at least two turbines, for generating at least one actuating signal, in dependence upon not only the at least one regulating intermediate variable, typically involving the regulating exhaust-gas back pressure, but also on at least one further operating parameter or on the estimated value determined in the estimated value unit.

If the turbine system model determines an overall efficiency of the turbine system, and the compressor system model-determines an overall efficiency of the compressor system, with at least the compressor system being complex in as far as it includes at least two compressors, it becomes possible in an advantageous way to arrange interfaces between the estimated value unit, the regulating unit and the actuating signal generating unit, such that these interfaces do not differ from the corresponding interfaces of a corresponding control for a simple exhaust-gas turbocharger with only a single-stage charge, and in particular from a simple compressor system with only one compressor, powered by a simple turbine system with only one turbine. This is achieved through the regulating unit set up for determining at least one regulating intermediate variable—so preferably the regulating exhaust-gas back pressure, or the variable dependent on the nominal exhaust-gas back pressure—in dependence upon the estimated overall efficiencies of the turbine system and of the compressor system. The said interfaces are therefore independent of the chosen system configuration of the turbine system and the compressor system for the exhaust-gas turbocharging device. In addition, an adaptation of the device for another system configuration is thus easily possible—the compressor system model, the turbine system model and/or the inverse turbine system model are independent of each other, which typically is possible through a corresponding program adjustment of the achieved device, and without effect on the whole structure. In particular, no interfaces between the estimated value unit, the regulating unit and the actuating signal generating unit are required for the internal operating parameters of the turbine system or the compressor system, the definition of which depends on an inner structure of the compressor system or of the turbine system. In many cases, for an adaptation of the device for another system configuration of the exhaust-gas turbocharging device, a reprogramming of the compressor system model, the turbine system model and/or the inverse turbine system model will not even be necessary, but simply a new data input. Consequentially the realization of a corresponding control device for a new engine and/or exhaust-gas turbocharging model is possible with exceptionally low effort and expenditure.

With regard to simple feasibility, for a practical embodiment, the estimated value unit is set up for determining a mass flow through a turbine system of the exhaust-gas turbocharging device which is positioned in an intake tract of the internal combustion engine, in dependence upon the operating parameters of the internal combustion engine, with the actuating signal generating unit being set up to generate the at least one actuating signal, in dependence upon the estimated mass flow through the turbine system, and preferably additionally in dependence upon the exhaust-gas pressure downstream of the turbine system, and upon an exhaust-gas temperature upstream of the turbine system. The estimated value unit can also be set up for determining an estimated exhaust-gas back pressure.

A control apparatus suitable for the most common exhaust-gas turbocharging configurations is given when the compressor system, modeled by the compressor system model, includes a low-pressure compressor and a series-connected high-pressure compressor downstream of the low-pressure compressor, with the compressor system model being set up for determining the overall efficiency of the compressor system, in dependence upon the operating parameters of the internal combustion engine, and upon the efficiency of the low-pressure compressor and high-pressure compressor modeled on engine maps. In this way, the overall efficiency of the compressor system can be determined for example as:

$$\eta_C = \mu_{C,LP} \cdot \eta_{C,HP} \cdot a / (\eta_{C,HP} \cdot b + \eta_{C,LP} \cdot c + b \cdot c)$$

or the variable derived therefrom, whereby $\eta_C$ stands for the overall efficiency of the compressor system, $\eta_{C,LP}$ stands for the efficiency of the low-pressure compressor and $\eta_{C,LP}$ stands for the efficiency of the high-pressure compressor, and whereby a, b, and c stand for variables which only depend on actual charge pressure, on a suction pressure appropriate for the operating parameters upstream of the compressor system and on a prevailing intermediate pressure in the intake tract between the low-pressure compressor and the high-pressure compressor. This intermediate pressure can be measured or calculated simply. The term 'operating parameter' in this document stands in general for measured variables or variables derived therefrom.

The corresponding device can be adapted to very different compressor systems in a known way through choice of corresponding engine maps for the efficiencies of each compressor, with an adaptation to a simple exhaust-gas turbocharger with only one compressor also being possible without any problems, in which one of the efficiencies of the high-pressure compressor or the low-pressure compressor is defined as $\eta_{C,HP}=1$, or $\eta_{C,LP}=1$, at the same time the intermediate pressure is identified with the actual charge pressure downstream of the compressor system or the suction pressure upstream of the compressor system.

A control of the exhaust-gas turbocharging device which has lower calculation costs and efforts, and is therefore quicker, by means of the regulating exhaust-gas back pressure as a control quality, is possible when the regulating unit includes a concurrent pilot control with an intrinsic controller for determining a pilot control exhaust-gas back pressure in dependence upon the operating parameters of the internal combustion engine, upon the nominal charge pressure and upon the estimated overall efficiencies of the turbine system and the compressor system. The controller is correspondingly set up for determining the regulating exhaust-gas back pressure by using the pilot control exhaust-gas back pressure determined by the pilot control. The operating parameters used by the pilot control for determining the pilot control exhaust-gas back pressure or variables derived therefrom can comprise, in particular, a suction pressure upstream of the compressor system, an exhaust-gas pressure downstream of the turbine system, an intake air temperature upstream of the compressor system, an exhaust-gas temperature upstream of the turbine system, a mass flow through the compressor system and the estimated mass flow through the turbine system. In simple embodiments, the regulating unit does not require further input variables, apart from the nominal charge pressure typically determined in dependence upon the accelerator pedal position, and the actual charge pressure. In particular, the operating parameters used by the regulating unit and in particular by the pilot control should not include internal operating parameters of the compressor system or the turbine system, but if necessary should depend indirectly on such internal operating parameters with a dependence which is then taken into account in the estimated value unit. In this way, for example, the overall efficiency of the turbine system depends on the position of the actuating member of the turbine system, with the corresponding dependence, however, being considered in the turbine system model and having no influence on the structure of the regulating unit or an interface to the regulating unit.

It can be provided that the exhaust-gas turbocharging device is additionally fitted to the internal combustion engine with an exhaust-gas recirculation control. An advantageous decoupling of a here described control circuit of the exhaust-gas turbocharging device from a control circuit of the exhaust-gas recirculation control can then be achieved through a decoupling unit, which is set up for determining a decoupling mass flow by correcting the estimated mass flow through the turbine system, in dependence upon a state variable or controlled variable of the exhaust-gas recirculation control. A decoupling of the two control circuits is thus easily achieved, since the inverse turbine system model generates at least one actuating signal depending on the decoupling mass flow, and insofar as it is only indirectly dependent on the estimated mass flow through the turbine system.

Typically, the turbine system modeled on the turbine system model and the inverse turbine model will comprise at least two turbines for powering the at least two compressors of the compressor system. In this way the turbine system can feature, in particular, a high-pressure turbine for powering the high-pressure compressor, and a low-pressure turbine connected in series downstream of the high-pressure turbine for powering the low-pressure compressor.

The model-based turbine system controlled by the device can also include in each case at least one actuator controlled by the actuating signal generating unit, not only for the first but also for the second of the said turbines. In this way, an advantageously accurate control of the exhaust-gas turbocharging device becomes possible. Thereby the actuating signal generating unit can be set up for the generation of at least one actuating signal for the at least one actuator of the first turbine, as well as at least one actuating signal for the second turbine in the same way, so that depending on whether a threshold value of a controlled variable is exceeded or is not reached, either only the at least one actuating signal assigned to the first turbine is varied, whereas the at least one actuator of the second turbine takes a constant extremal position, or only the at least one actuating signal assigned to the second turbine is varied, whereas the at least one actuator of the first turbine takes a constant extremal position. Advantageously, for this purpose, if the threshold value is exceeded or is not reached, a switch will be made between two different engine maps included in the inverse turbine system model, which serve in any case for determining at least one actuating signal for the turbine, in which at least one actuator just serves as a charge pressure control apparatus.

For determining at least one actuating signal, the inverse turbine system model can include, in particular, at least one engine map, which defines the corresponding actuating signal or actuating signals or a combination of these actuating signals in dependence upon a pressure quotient, which is generated from the regulating exhaust-gas pressure and a measured or calculated exhaust-gas pressure as an operating parameter downstream of the turbine system, and is generated by a pressure- and temperature-normalized mass flow, and is generated in dependence upon the estimated mass flow through the turbine system. The use of the pressure- and temperature-normalized mass flow is advantageous in this process, as it allows for a particularly simple representation of the engine map and with it the inverse turbine system model. The above mentioned regulating exhaust-gas back pressure, as well as an exhaust-gas temperature measured or calculated as an operating parameter, can be used for the generation of the pressure- and temperature-normalized mass flow in a very simple way in the exhaust-gas tract upstream of the turbine system. For this purpose the estimated mass flow through the turbine system or where necessary the decoupling mass flow calculated from it can be multiplied by the square root of the exhaust-gas temperature in the exhaust-gas tract upstream of the turbine system and divided by the regulating exhaust-gas back pressure, in some cases with a further multiplication by a normalization factor. In each case the at least one engine map used by the inverse turbine can be generated such that it shows no dependence upon internal operating parameters of the turbine system, that is to say, no dependence upon such operating parameters, whose definition depends on the system configuration of the turbine system.

The turbine system model used for determining the overall efficiency of the turbine system can in turn be realized with at least one engine map, which allows for a determination of this overall efficiency in dependence upon the above named pressure quotient of the regulating exhaust-gas back pressure and the measured or calculated exhaust-gas pressure downstream of the turbine system, and on a current position of the at least one actuator. At a given position of the at least one actuator of the turbine system, this engine map should in turn also show no dependence upon the internal operating parameters of the turbine system, which is also not necessary for a correct modeling, and, independent of the system configuration, facilitates an arrangement of the interfaces between the estimated value unit and the regulating unit as well as the actuating signal generating unit.

Each turbine of the turbine system can be fitted with variable turbine geometry, and correspondingly feature a turbine geometry actuator, as well as being provided with a wastegate valve as the only actuator or the actuator used for the turbine geometry actuator. When one of the turbines or each turbine is fitted with variable turbine geometry as well as with a wastegate, a common, one-parametric actuating signal can be used for controlling the corresponding actuators of the respective turbine, which allows for a useful control of the actuators as well as a simple modeling of the turbine system. For this purpose, the actuating signal generating unit can be designed in such a way that commencing with an extremal position, in which the wastegate is closed, and the corresponding turbine exhibits a minimal open cross-section, first of all the cross-section of the turbine is opened with the wastegate closed, wherein the wastegate only starts to be opened when the turbine is fully open, namely while retaining a maximal flow cross-section of the turbine. Then, in an embodiments, the low-pressure turbine is first selected, where necessary, through a gradual opening of a turbine cross-section and/or a wastegate valve, when the high-pressure turbine connected in front of it is already completely opened, and/or a waste-gate valve of the high-pressure turbine is opened. Alternatively or additionally the high-pressure turbine can feature a bypass valve as well, which allows for a bypassing of the high-pressure turbine and therefore effectively a reduction of the turbine system to the low-pressure turbine.

Lastly, a bypass-valve can be provided which allows for a bypassing of the high-pressure compressor driven by the high-pressure turbine, which is then expediently opened exactly when the high-pressure turbine and/or wastegate valve of the high-pressure turbine and/or a bypass valve of the high-pressure turbine is completely opened. In each of these described cases, a decidedly simple modeling of the turbine system as well as of the compressor system is possible without any problems, whereby where necessary different engine maps will be referred to, depending on which of the turbines is controlled, i.e. is varied with regard to its actuator position, while the actuator positions of the respective other turbine are constant.

Figure 1A:
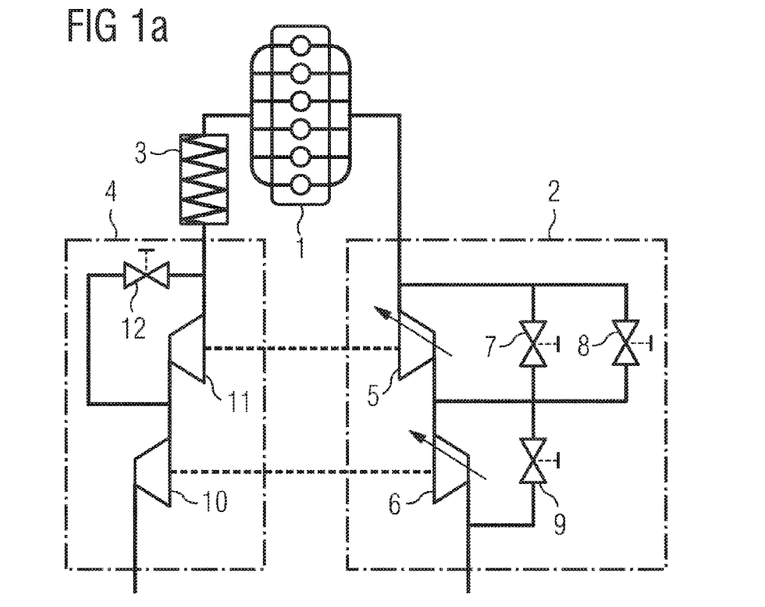
FIG. 1a is a diagram of an internal combustion engine with serial exhaust-gas turbocharging with a superset of possible actuators.

The internal combustion engine, depicted in FIG. 1a, features besides an engine block 1 depicted here with six cylinders, an exhaust tract with a turbine system 2, as well as an intake tract which comprises besides an intercooler 3 a compressor system 4.

The turbine system 2 in turn comprises two turbines, namely a high-pressure turbine 5 fitted with variable turbine geometry, as well as a low-pressure turbine 6 also fitted with variable turbine geometry and series-connected to the high-pressure turbine 5 downstream in the exhaust-gas tract. Turbine-geometry actuators of the high-pressure turbine 5 and the low-pressure turbine 6 are each illustrated by an arrow. As a further actuator attached to the high-pressure turbine 5, a wastegate valve 7 is provided, which is connected in parallel to the high-pressure turbine 5. In addition, the high-pressure turbine 5 can be completely bypassed by opening a bypass valve 8. Finally a further wastegate valve 9, which can be considered as an additional actuator of the low-pressure turbine 6, is connected in a path of the exhaust-gas tract which is parallel to the low-pressure turbine 6 inside the turbine system 2.

The compressor system 4 features a low-pressure compressor 10 driven by the low-pressure turbine 6, as well as a high-pressure compressor 11, driven by the high-pressure turbine 5, and connected in series in the intake tract downstream of the low-pressure compressor 10. A further bypass valve 12 is connected in parallel to the high-pressure compressor 11, so that the high-pressure compressor can be bypassed by opening this bypass valve.

The turbine system 2, together with the compressor system 4, forms an exhaust-gas turbocharging device for exhaust-gas turbocharging of the depicted internal combustion engine, which can be controlled with a control apparatus itself not shown in FIG. 1a, and indeed through controlling the actuators of the turbine system 2, which are given through the turbine geometry actuators of both turbines as well as through the wastegate valves 7 and 9 and the bypass valve 8. As a further actuator, which is assigned to the compressor system, the same control apparatus also controls the bypass valve 12.

Figure 1B:
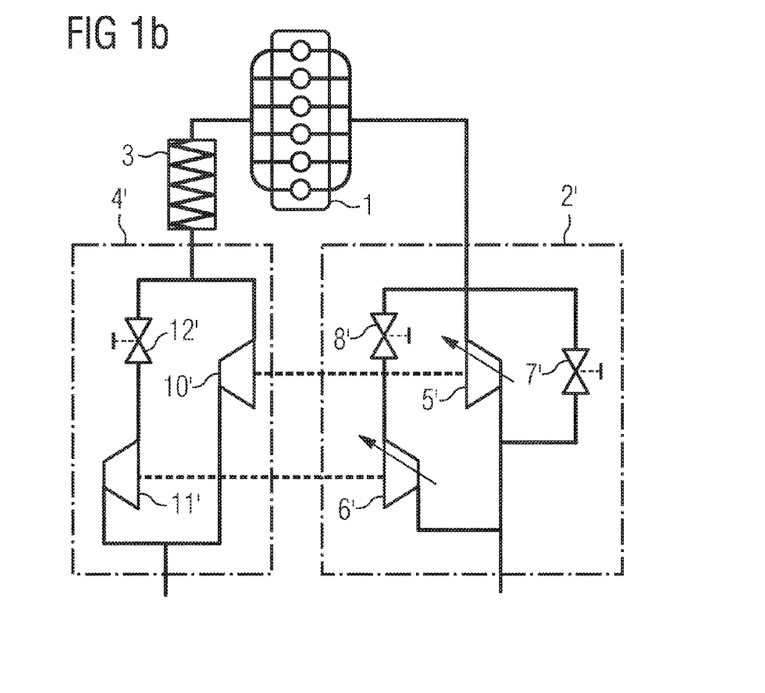
FIG. 1b is a corresponding diagram of an internal combustion engine with an alternatively designed exhaust-gas turbocharging device, through which a parallel exhaust-gas turbocharging device is realized, with a superset of possible actuators.

A corresponding internal combustion engine with an alternatively implemented turbocharger is depicted in FIG. 1b, where there are recurring features again provided with the same reference characters. An exhaust-gas turbocharging device of this internal combustion engine again comprises a turbine system 2' and a compressor system 4', here with the turbine system 2' featuring a first turbine 5' and a second turbine 6' connected to it in parallel, deviating from the previous example. In this process, the first turbine 5' drives a first compressor 10' of the compressor system 4', and the second turbine drives a second compressor 11' connected in parallel to the first compressor 10'. Here, a wastegate valve 7' for bypassing the first turbine 5', as well as a cut-off valve 8' for closing off the second turbine 6', and a selected cut-off valve 12', expediently together with this cut-off valve 8', for the second compressor 11', and additionally actuators for variable turbine geometries of both turbines 5' and 6' are illustrated as actuators. As in the example in FIG. 1a, the said actuators are to be understood as a superset of possible actuator combinations, of which subsets can also be implemented in different embodiments. Again, a control apparatus not depicted in FIG. 1b is provided for controlling the actuators.

Figure 2:
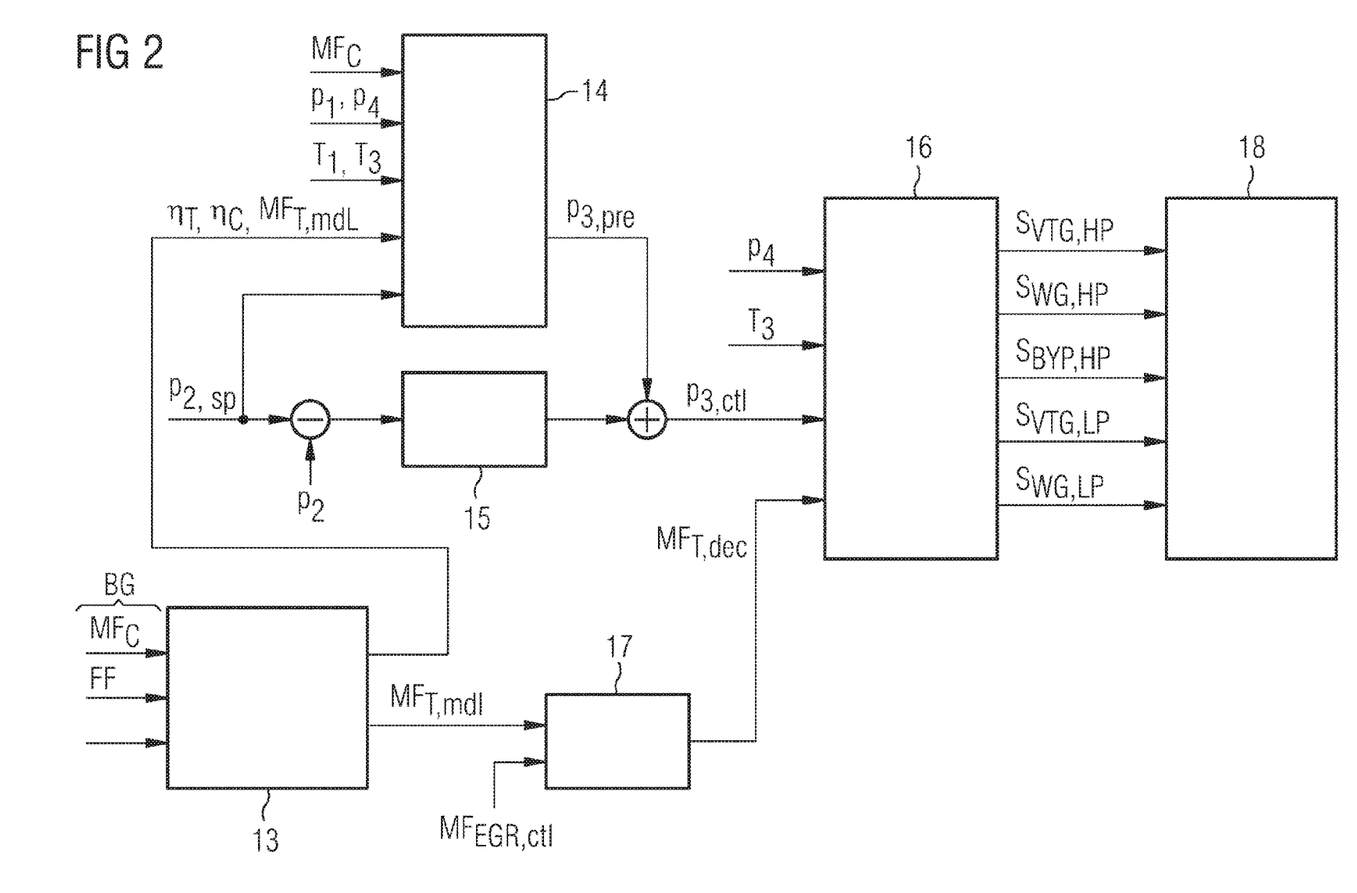
FIG. 2 is a flow diagram of a device for controlling the exhaust-gas turbocharging of the internal combustion engine in FIG. 1a, FIG. 3 is an engine map for an inverse turbine system model used in this device, shown as a three-dimensional diagram.

The control apparatus for the exhaust-gas turbocharging of the internal combustion engine in FIG. 1a is shown schematically in FIG. 2, with a control apparatus for the alternative exhaust-gas turbocharging from FIG. 1b being able to be implemented in exactly the same way. Different components of the control apparatus are illustrated by blocks in FIG. 2, which do not necessarily need to be objectively separated, but rather can be implemented simply technically through different subprograms.

The depicted device for controlling the exhaust-gas turbocharging features in particular an estimated value unit 13, which includes a physical model of the internal combustion engine, and inter alia is set up for determining an estimated mass flow $MF_{T,mdl}$ through the turbine system 2 in dependence upon operating parameters BG of the internal combustion engine. In particular, a mass flow $MF_C$ of intake air through the compressor system 4 as well as a fuel mass flow FF, both of which are determined as measured variables, will be used as operating parameters BG in this way. In addition, the estimated value unit 13 comprises a turbine system model for determining a modeled overall efficiency $\eta_T$ of the turbine system 2, as well as a compressor system model for determining a modeled overall efficiency $\eta_C$ of the compressor system 4.

Furthermore, the control apparatus features a regulating unit, formed of a pilot control 14 and a controller 15, for determining a regulating exhaust-gas back pressure $p_{3,ctl}$ in dependence upon a nominal charge pressure $p_{2,sp}$ and an actual charge pressure $p_2$ measured as an operating parameter. The regulating exhaust-gas back pressure $p_{3,ctl}$ is determined by using the estimated overall efficiencies $\eta_T$ and $\eta_C$ of the turbine system 2 and the compressor system 4. For this purpose the pilot control 14, to which the overall efficiencies $\eta_T$ and $\eta_C$ as well as the estimated mass flow $MF_{T,mdl}$ will be transferred from the estimated value unit 13 over an interface, determines first of all a pilot control exhaust-gas back pressure $p_{3,pre}$ in dependence upon the variables obtained from the estimated value unit 13, as well as on the nominal charge pressure $p_{2,sp}$ and on further operating parameters of the internal combustion unit, which are typically directly measured. The regulating exhaust-gas back pressure $p_{3,ctl}$ is then obtained by means of the correspondingly programmed controller 15 from the pilot control exhaust-gas back pressure $p_{3,pre}$, in which dependent on a difference between the nominal charge pressure $p_{2,sp}$ and the actual charge pressure $p_2$, a correction value is determined, which is then added to the pilot control exhaust-gas back pressure $p_{3,pre}$. The operating parameters used by the pilot control 14 for determining the pilot control exhaust-gas back pressure $p_{3,pre}$ comprise a suction pressure $p_1$ upstream of the compressor system 4, an exhaust-gas pressure $p_4$ downstream of the turbine system 2, an intake air temperature $T_1$ upstream of the compressor system 4, an exhaust-gas temperature $T_3$ upstream of the turbine system 2, and the mass flow $MF_C$ of the intake air flowing through the compressor system 4. Corresponding sensors in the intake tract and the exhaust-gas tract of the internal combustion engine are provided for measuring all or some of these operating parameters. In certain circumstances, some of the said operating parameters can also be calculated, for example in the estimated value unit 13, so that at least an immediate measuring is unnecessary. However, neither the pilot control 14 nor the controller 15 uses internal operating parameters of the compressor system 4 or of the turbine system 2, and therefore no interfaces for such internal operating parameters between the estimated value unit 13 and the regulating unit are provided. The pilot control exhaust-gas back pressure $p_{3,pre}$ can be determined by the pilot control 14 in particular as follows:

$$p_{3,pre} = p_4 \left( 1 - \frac{MF_c \cdot c_{p,air} \cdot T_1}{\eta_C \cdot \eta_T \cdot MF_{T,mdl} \cdot c_{p,exh} \cdot T_3} \cdot [(p_{2,sp}/p_1)^{1-1/K_{air}} - 1] \right)^{K_{exh}/(1-K_{exh})}$$

In this equation, $C_{p,air}$ stands for the specific heat parameter of air under constant pressure, $C_{p,exh}$ stands for the specific heat parameter of the exhaust-gas passing through the exhaust-gas tract under constant pressure, $K_{air}$ stands for the isentropic exponents of air, and $K_{exh}$ stands for the isentropic exponents of the exhaust gas. In particular, this equation can be very easily represented as an engine map, under the simplifying assumption that the isentropic exponents $K_{air}$ and $K_{exh}$ are constant.

Finally, the control apparatus shown in FIG. 2 also features an actuating signal generating unit 16, which comprises an inverse turbine system model, and is set up for generating actuating signals $S_{VTG,HP}$, $S_{WG,HP}$, $S_{BYP,HP}$, $S_{VTG,LP}$ and $S_{WG,LP}$ for the already mentioned actuators of the turbine system 2, in dependence upon the regulating exhaust-gas back pressure $p_{3,ctl}$ and on the estimated mass flow $MF_{t,mdl}$ through the turbine system 2. In this process, $S_{VTG,HP}$ denotes a turbine geometry actuating signal for the high-pressure turbine 5, $S_{WG,HP}$ denotes an actuating signal for the wastegate valve 7, $S_{BYP,HP}$ denotes an actuating signal for the bypass valve 8, in dependence upon the bypass valve 12 being opened at the same time as bypass valve 8, $S_{VTG,LP}$ denotes a turbine geometry actuating signal for the low-pressure turbine 6 and $S_{WG,LP}$ denotes an actuating signal for the wastegate valve 9.

The depicted control apparatus forms a part of a control circuit of the exhaust-gas turbocharging, with which, in particular, the charge pressure $p_2$ should be regulated. Now the internal combustion engine depicted in FIG. 1a and controlled by the control apparatus is additionally fitted with an exhaust-gas recirculation device not depicted here. In order to decouple the control circuit of the exhaust-gas turbocharging from a control circuit of this exhaust-gas recirculation device, the control apparatus shown in FIG. 2 additionally features a decoupling unit 17, which is set up for determining a decoupling mass flow $MF_{T,dec}$ by correcting the mass flow $MF_{T,mdl}$ estimated by the estimated value unit 13, in dependence upon a state or controlled variable $MF_{EGR,ctl}$ of the exhaust-gas recirculation device, which here relates to an exhaust-gas return flow used as a state variable. The turbine system model encompassed by the actuating signal generating unit 16 generates the actuating signal for the present exemplary embodiment, therefore indirectly in dependence upon the estimated mass flow $MF_{T,mdl}$, insofar as it contains the decoupling mass flow $MF_{T,dec}$ derived from the decoupling unit 17. A comparable decoupling of two control circuits is described in more detail in the document WO 2006/106058 A1. The inverse turbine system model which determines the actuating signals $S_{VTG,HP}$, $S_{WG,HP}$, $S_{BYP,HP}$, $S_{VTG,LP}$ and $S_{WG,LP}$ with the help of engine maps, uses measured operating parameters, namely in particular the exhaust gas temperature $T_3$, measured in the exhaust-gas tract upstream of the turbine system 2, or calculated in the estimated value unit 13, and the exhaust-gas pressure $p_4$, measured or calculated in the exhaust-gas tract downstream of the turbine system 2. However, the engine maps used by the inverse turbine system model show no dependence upon the internal operating parameters of the turbine system 2. The already named actuators in dependence upon the actuating signals $S_{VTG,HP}$, $S_{WG,HP}$, $S_{BYP,HP}$, $S_{VTG,LP}$ and $S_{WG,LP}$ which the actuator-control 18 receives from the actuating signal generating unit 16, are configured with an actuator-control 18, depicted rightmost in FIG. 2, whereby the actuators include corresponding drives or actuators.

The actuating signal generating unit 16 can also be set up for generating limit-value indicators which, when limit values are reached, are sent to the controller 15 by input or output values of the actuating signal generating unit 16, and thus limit a control process in order to avoid an overdrive.

The compressor system model included by the estimated value unit 13 determines the overall efficiency $\eta_C$ of the compressor system 4, in dependence upon the operating parameters BG of the internal combustion engine, and upon the efficiencies $\eta_{C,LP}$ and $\eta_{C,HP}$ of the low-pressure compressor 10 and the high-pressure compressor 11, modeled by individual engine maps. In the event that the bypass valve 12 is opened, the overall efficiency $\eta_C$ of the compressor system 4 can be identified together with the efficiency $\eta_{C,LP}$ of the low-pressure compressor 10. Otherwise, the overall efficiency $\eta_C$ of the compressor system 4 in the present exemplary embodiment is determined by the compressor system model as:

$$\eta_C = \eta_{C,LP} \cdot \eta_{C,HP} \cdot a / (\eta_{C,HP} \cdot b + \eta_{C,LP} \cdot c + b \cdot c)$$

whereby the variables a, b and c depend only on the actual charge pressure $p_2$, on the suction pressure $p_1$ measured as an operating parameter upstream of the compressor system 4, and on a prevailing intermediate pressure $p_{inter}$ between the low-pressure compressor 10 and the high-pressure compressor 11, and are defined as follows:

$$a = (p_2/p_1)^{1-1/\kappa_{air}} - 1$$

$$b = (p_{inter}/p_1)^{1-1/\kappa_{air}} - 1$$

$$c = (p_2/p_{inter})^{1-1/\kappa_{air}} - 1$$

For this purpose, the intermediate pressure $p_{inter}$ can be measured either as an internal operating parameter of the compressor system 4, or also can be calculated in a simple way, in dependence upon the suction pressure $p_1$ and on the efficiency $\eta_{C,LP}$ of the low-pressure compressor. For this purpose, the overall efficiency $\eta_C$, as a physical variable, shows the quotient from the isentropic compression performance of the compressor system 4, and the sum of the mechanical performance of the compressor in the compressor system 4.

The engine map, with which the efficiency $\eta_{C,LP}$ of the low-pressure compressor is determined, shows also a dependence upon the intake air temperature $T_1$, which is measured anyway, while the engine map for the efficiency $\eta_{C,HP}$ of the high-pressure compressor depends on a prevailing temperature in the intake tract between the low-pressure compressor 10 and the high-pressure compressor 11, which does not necessarily need to be measured, since it is given by way of calculation from the intake air temperature $T_1$ and the efficiency $\eta_{C,LP}$ of the low-pressure compressor 10. Additionally, it is possible for the mechanical performance invested in the low-pressure compressor 10 and the high-pressure compressor 11 to be easily obtained from other operating parameters.

Figure 3:
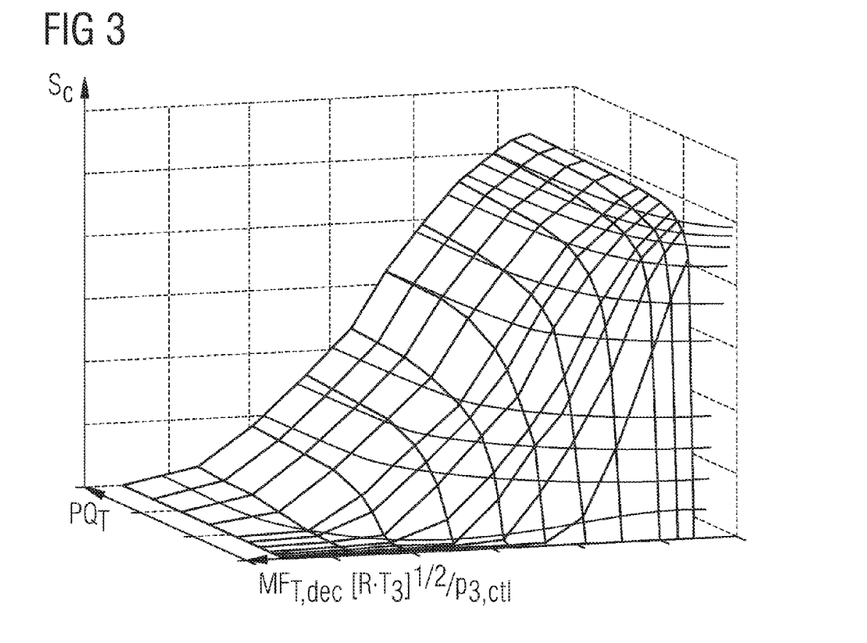

The inverse turbine system model includes an engine map for determining the actuating signals $S_{VTG,LP}$, $S_{WG,HP}$ and $S_{BYP,HP}$, as well as a further engine map for generating the actuating signals $S_{VTG,LP}$ and $S_{WG,LP}$. For this purpose, the actuating signals $S_{VTG,LP}$, $S_{WG,HP}$ and $S_{BYP,HP}$, or $S_{VTG,LP}$ and $S_{WG,LP}$ assigned to one turbine are in any case brought together with a combined actuating signal $S_C$. An engine map of this type of the inverse turbine system model is depicted in FIG. 3. It shows the corresponding combined actuating signal $S_C$ in dependence upon a pressure quotient $PQ_T$ defined as $PQ_T = p_{3,ctl}/p_4$, and in dependence upon a pressure- and temperature-normalized mass flow $MF_{T,dec}$ $[R \cdot T_3]^{1/2}/p_{3,ctl}$, which is generated according to this expression from the decoupling mass flow $MF_{T,dec}$, and therewith in dependence upon the estimated mass flow $MF_{T,mdl}$, with R standing for a normalizing constant. The actuating signal generating unit 16 is correspondingly programmed for this purpose.

Figure 4:
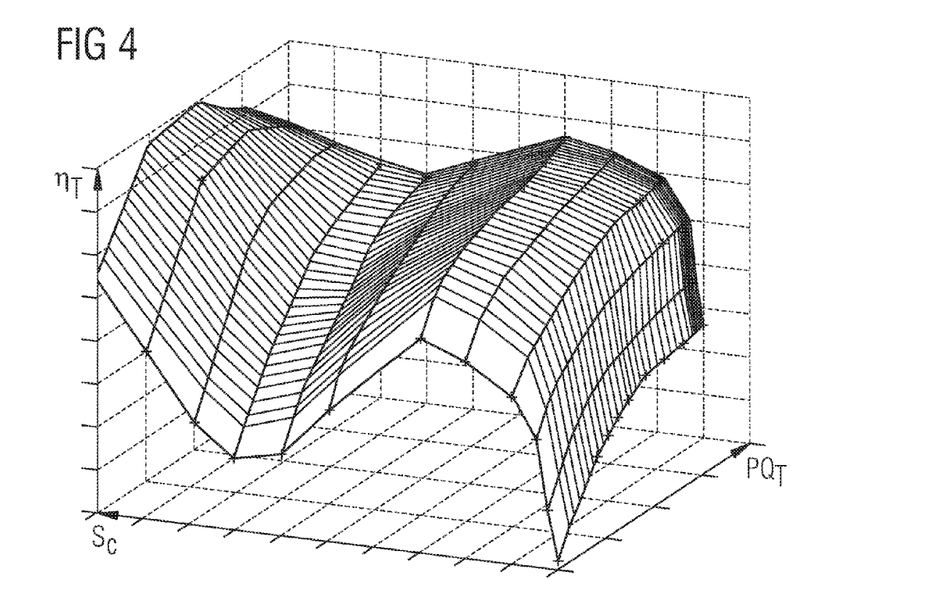
FIG. 4 shows, in a similar diagram, a turbine system model used in a different position in the device.

In a similar way, the turbine system model included by the estimated value unit 13 is implemented by engine maps, which give the overall efficiency $\eta_T$ in dependence upon the already named pressure quotient $PQ_T$, and upon a current combined actuator position $S_C$. Apart from the respective actuator position $S_C$, these engine maps show no dependence upon internal operating parameters of the turbine system 2. One of these engine maps is depicted as an example in FIG. 4.

Figure 5:
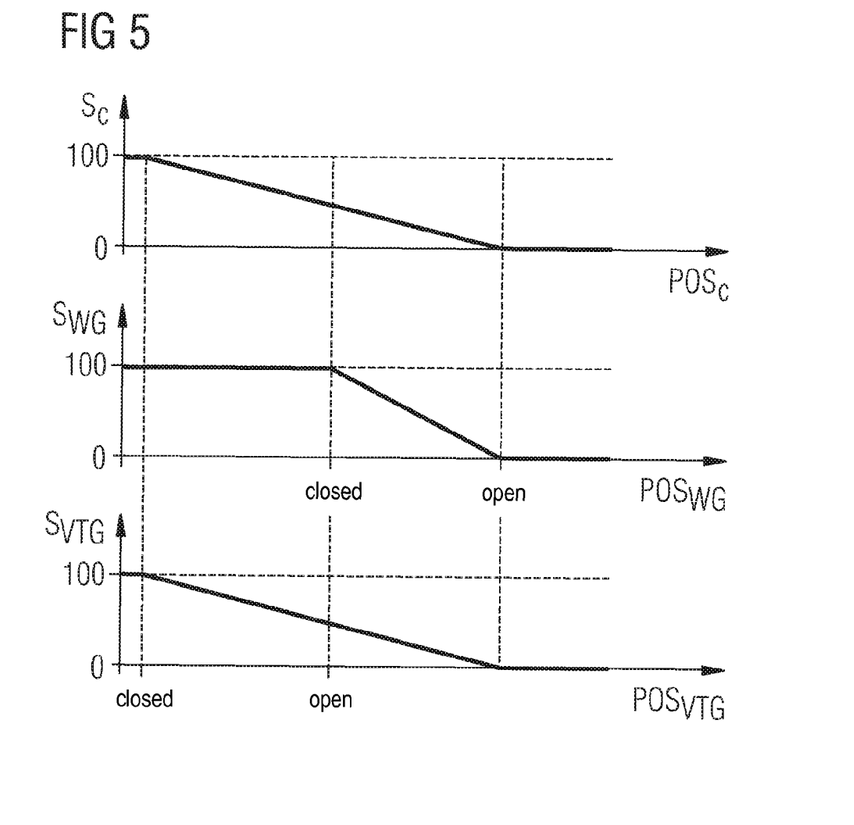
FIG. 5 is a diagrammatic depiction of a generation of a combined actuating signal for the exhaust-gas turbocharging device.

FIG. 5 is a graphical representation of how one of the combined actuator positions $S_C$ is generated in dependence upon a turbine geometry actuating signal $S_{VTG}$, and upon an actuating signal for a wastegate valve $S_{WG}$ assigned to an identical turbine. For this purpose, an actuator position $POS_{VTG}$ of an actuator adapted to a turbine fitted with variable turbine geometry, depending on a turbine geometry actuating signal $S_{VTG}$, is set, whereas an actuator position $POS_{WG}$ of the corresponding wastegate valve is set dependent on an actuating signal $S_{WG}$. Both of these actuators assigned to this turbine are expediently driven, such that the turbine geometry is only adjusted when the wastegate valve is closed, whereas the wastegate valve is only adjusted when the turbine geometry is correspondingly set to a maximal flow cross-section. In this way, independently of both actuator positions $POS_{VTG}$ and $POS_{WG}$, a one-parametric combined actuator position $POS_C$ can be defined for this turbine, which is determined or given by the combined actuating signal $S_C$, represented in the uppermost section of FIG. 5. The combined actuating signal $S_C$ is accordingly connected clearly to the both actuating signals $S_{VTG}$ and $S_{WG}$. In the described way, a combined actuating signal $S_C$ is defined for the high-pressure turbine 5 as well as for the low-pressure turbine 6 respectively. Lastly, the bypass valve 8 is opened exactly when the combined actuating signal $S_C$ of the high-pressure turbine 5 determines a complete opening of the high-pressure turbine 5 as well as of the wastegate valve 7.

Figure 6:
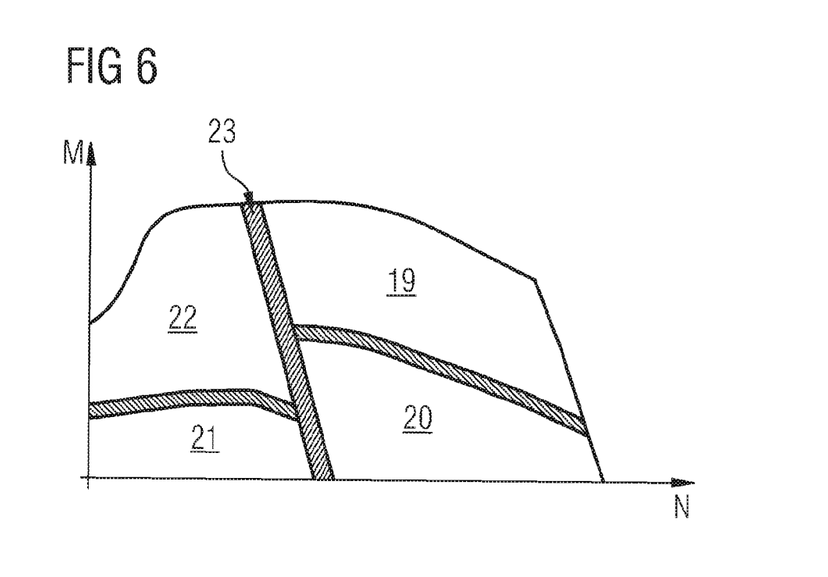
FIG. 6 is a diagram which illustrates the ranges of the different operating parameters of the internal combustion engine.

Finally in FIG. 6, four different ranges of operating parameters 19, 20, 21 and 22 are illustrated in a diagram, which differ from each other in different values of a number of revolutions N of the internal combustion engine, and of a turning moment M of the internal combustion engine. For this purpose, the turning moment M is given dependently on the number of revolutions N and on the actual charge pressure $p_2$, which is in turn regulated normally on the nominal charge pressure $p_{2,sp}$ in the described way, with the charge pressure $p_{2,sp}$ being defined in dependence upon an accelerator pedal position.

In the center of FIG. 6, a transition region 23 is shown with crosshatches, which separates the operating parameter ranges 19 and 20 from the operating parameter ranges 21 and 22. The control apparatus of the exhaust-gas turbocharging is only programmed such that with operating states with a lower number of rotations N, which lie to the left of the transition region 23 in the diagram in FIG. 6, a control of the charge pressure $p_2$ takes place by adjusting the actuators of the high-pressure turbine 5 with a completely closed wastegate valve 9, and with a minimal flow cross-section of the low-pressure turbine 6; whereas in operating states with a higher number of rotations N, which is shown to the right of the transition region 23 in the diagram in FIG. 6, a control of the charge pressure $p_2$ is achieved by an adjustment of the actuators, which are assigned to the low-pressure turbine 6, whereas the high-pressure turbine 5, the wastegate valve 7, and the bypass valve 8 are completely opened. For this purpose, the transition region 23 has a finite width, whereby a hysteresis is defined, which avoids an unnecessary jump between control methods according to adjacent operating parameter ranges 19 and 22 or 20 and 21.

In the operating parameters 20 and 21 corresponding to very low turning moments M, the charge pressure $p_2$ is not regulated, but rather only controlled by an unregulated control of the actuators. In the overlying operating parameter ranges 19 and 22, however, the original charge pressure control takes place with the control apparatus described before.

For the regulated control of the exhaust-gas turbocharging, and thus of the charge pressure $p_2$, the actuating signal generating unit 16 is accordingly set up so that either only the actuating signals $S_{VTG,HP}$, $S_{WG,HP}$ and $S_{BYP,HP}$ assigned to the high-pressure turbine 5 or the combined actuating signal $S_C$ defined according to FIG. 5 in dependence thereon are varied, whereas the actuators of the low-pressure turbine 6 take a closed extremal position to the greatest extent possible, or so that only the actuating signals $S_{VTG,LP}$ and $S_{WG,LP}$ assigned to the low-pressure turbine 6 or the combined actuating signal $S_C$ generated accordingly therefrom in FIG. 5 are varied, whereas the actuators of the high-pressure turbine are completely open. If the operating state of the internal combustion engine changes in such a way that it crosses the transition region 23 between the operating parameter ranges 19 and 22, the system will accordingly be switched between two different engine maps of the inverse system model as well as also between two engine maps used by the estimated value unit 13 for determining the overall efficiency $\eta_T$. A change from an access to one of the engine maps to an access to the other engine map is meant by 'switching' in each case. For this purpose, the transition region 23 defines for each turning moment M two threshold values for the number of rotations N, spaced for a hysteresis balance, in which a switching of this kind takes place.

What is claimed is:

1. A device for controlling exhaust-gas turbocharging of an internal combustion engine with an exhaust-gas turbocharging device, comprising:
   an estimated value unit which comprises a physical model of the internal combustion engine,
   a regulating unit for determining a regulating exhaust-gas back pressure or at least one other regulating intermediate variable in dependence upon a nominal charge pressure and an actual charge pressure, either measured as an operating parameter or derived from an operating parameter,
   an actuating signal generating unit for generating at least one actuating signal for at least one actuator of a turbine system of the exhaust-gas turbocharging device,
   wherein the estimated value unit includes a turbine system model for determining a current estimated overall efficiency of the turbine system, and a compressor system model for determining a current overall efficiency of a compressor system of the exhaust-gas turbocharging device having at least a low-pressure compressor and a high-pressure compressor and arranged in an intake system of the internal combustion engine, wherein the compressor system model is configured to determine the current overall efficiency of the compressor system based on current operating parameters of the internal combustion engine and on overall efficiencies of the low-pressure compressor and the high-pressure compressor as modeled by engine maps, and wherein the regulating unit is configured to determine the regulating exhaust-gas back pressure or the at least one other regulating intermediate variable based on the current estimated overall efficiencies of the turbine system and of the compressor system.

2. The device according to claim 1, wherein the estimated value unit is set up to determine a mass flow through a turbine system of the exhaust-gas turbocharging device set up in an intake tract of the internal combustion engine, in dependence upon operating parameters of the internal combustion engine, whereby the actuating signal generating unit is set up for generating at least one actuating signal in dependence upon the estimated miss flow through the turbine system or additionally in dependence upon an exhaust-gas pressure downstream of the turbine system, and upon an exhaust gas temperature upstream of the turbine system.

3. The device according to claim 1, wherein the compressor system model is set up for determining the overall efficiency of the compressor system as $$\eta_C = \eta_{C,LP} \cdot \eta_{C,HP} \cdot a/(\eta_{C,HP} \cdot b + \eta_{C,LP} \cdot c + b \cdot c)$$

or as a variable derived therefrom, whereby $\eta_C$ stands for the overall efficiency of the compressor system, $\eta_{C,LP}$ stands for the efficiency of the low-pressure compressor, and $\eta_{C,HP}$ stands for the efficiency of the high-pressure compressor, and whereby a, b, c stand for variables which only depend on the actual charge pressure, on a suction pressure measured as an operating parameter upstream of the compressor system and on a prevailing intermediate pressure in the intake tract between the low-pressure compressor and the high-pressure compressor.

4. The device according to claim 1, wherein the regulating unit comprises a controller as well as a pilot control for determining a pilot control exhaust-gas back pressure in dependence upon operating parameters of the internal combustion engine, on the nominal charge pressure and on the estimated overall efficiencies of the turbine system and of the compressor system, with the controller being set up for determining the regulating exhaust-gas back pressure by using the pilot control exhaust-gas back pressure.

5. The device according to claim 4, wherein the operating parameters used by the pilot control for determining the pilot control exhaust-gas back pressure or variables derived therefrom comprise a suction pressure upstream of the compressor system, an exhaust-gas pressure downstream of the turbine system, an intake air temperature upstream of the compressor system, an exhaust-gas temperature upstream of the turbine system, a mass flow through the compressor system and the estimated mass flow through the turbine system, but no internal operating parameters of the compressor system or of the turbine system.

6. The device according to claim 1, further comprising, for the decoupling of a control circuit of the exhaust-gas turbocharging device from a control circuit of the exhaust-gas recirculation device of the internal combustion engine, a decoupling unit which is set up for determining a decoupling mass flow by correcting the estimated mass flow through the turbine system in dependence upon a state variable or controlled variable of the exhaust-gas recirculation control, whereby the inverse turbine system model generates the at least one actuating signal in dependence upon the decoupling mass flow.

7. The device according to claim 1, wherein the turbine system modeled by the turbine system model and by the inverse turbine system model comprises at least two turbines to power the at least two compressors.

8. The device according to claim 7, wherein among the turbines are a high-pressure turbine and a low-pressure turbine connected in series downstream of the high-pressure turbine.

9. The device according to claim 7, wherein the turbine system comprises in each case at least one actuator controlled by the actuating signal generating unit both for a first and also for a second of the said turbines.

10. The device according to claim 9, wherein the actuating signal generating unit is set up for generating at least one actuating signal for the at least one actuator of the first turbine, as well as at least one actuating signal for the at least one actuator of the second turbine such that dependent on whether a threshold value of a controlled variable is exceeded or is not reached, either only the at least one actuating signal assigned to the first turbine is varied, whereas the at least one actuator of the second turbine takes a constant external position, or only the at least one actuating signal assigned to the second turbine is varied, whereas the at least one actuator of the first turbine takes a constant external position, whereby if the threshold value is exceeded or is not reached, a switch is made between two different engine maps included in the inverse turbine system model.

11. The device according to claim 1, wherein the inverse turbine system model for generating the at least one actuating signal comprises at least one engine map in dependence upon a pressure quotient which is generated from the regulating exhaust-gas back pressure, and an exhaust-gas pressure measured or calculated as an operating parameter downstream of the turbine system, and generated by a pressure- and temperature-normalized mass flow which is generated in dependence upon the estimated mass flow through the turbine system.

12. The device according to claim 11, wherein the at least one engine map of the inverse turbine system model reads out a combined actuating signal, which can be assigned to at least a first actuator and a second actuator such that during a monotonous varying of the combined actuating signal first of all at a constant first position of the second actuator, the first actuator is monotonously varied, from a first to a second position of the first actuator, whereby on reaching the second position of the first actuator, the second actuator is monotonously varied from a first to a second position of the second actuator.

13. The device according to claim 11, wherein the actuating signal generating unit is set up for generating the pressure- and temperature-normalized mass flow in dependence upon the regulating exhaust-gas back pressure and an exhaust-gas temperature measured as an operating parameter in the exhaust tract upstream of the turbine system.

14. The device according to claim 10, wherein the at least one engine map used by the inverse turbine system model shows no dependence on the internal operating parameters of the turbine system.

15. The device according to claim 1, wherein an overall efficiency of the turbine system is determined by means of a combined actuating signal in the estimated value unit.

16. The device according to claim 1, wherein in the estimated value unit an exhaust-gas back pressure upstream of the turbine system is determined by means of a combined actuating signal.

17. The device according to claim 1, wherein, for determining the overall efficiency of the turbine system, the turbine system model comprises at least one engine map in dependence upon a pressure quotient generated from the regulating exhaust-gas back pressure, and an exhaust-gas pressure measured as an operating parameter downstream of the turbine system, and upon a current position of the at least one actuator.

18. The device according to claim 17, wherein the at least one engine map used by the turbine system model shows no dependence upon the internal operating parameters of the turbine system, at a given position of the at least one actuator of the turbine system.

19. An internal combustion engine, comprising an exhaust-gas turbocharging device with a turbine system set up in an intake tract of the internal combustion engine, and a compressor system, having at least two compressors, set up in an intake tract of the internal combustion engine, wherein the internal combustion engine comprises a device for controlling exhaust-gas turbocharging comprising:

an estimated value unit which comprises a physical model of the internal combustion engine, a regulating unit for determining a regulating exhaust-gas back pressure or at least one other regulating intermediate variable in dependence upon a nominal charge pressure and an actual charge pressure, either measured as an operating parameter or derived from an operating parameter, an actuating signal generating unit for generating at least one actuating signal for at least one actuator of a turbine system of the exhaust-gas turbocharging device, wherein the estimated value unit includes a turbine system model for determining a current estimated overall efficiency of the turbine system, and a compressor system model for determining a current overall efficiency of a compressor system of the exhaust-gas turbocharging device having at least a low-pressure compressor and a high-pressure compressor and arranged in an intake system of the internal combustion engine, wherein the compressor system model is configured to determine the current overall efficiency of the compressor system based on current operating parameters of the internal combustion engine and on overall efficiencies of the low-pressure compressor and the high-pressure compressor as modeled by engine maps, and wherein the regulating unit is configured to determine the regulating exhaust-gas back pressure or the at least one other regulating intermediate variable based on the current estimated overall efficiencies of the turbine system and of the compressor system.

20. The device according to claim 1, wherein the actuating signal generating unit includes the inverse turbine system model for generating at least one actuating signal in dependence upon the regulating exhaust-gas back pressure or at least one other regulating intermediate variable, and on at least one further operating parameter or estimated value determined by the estimated value unit.

* * * * *